No. 855,228. PATENTED MAY 28, 1907.
W. J. BUSSINGER.
COFFEE MILL.
APPLICATION FILED OCT. 21, 1905.

UNITED STATES PATENT OFFICE.

WILLIAM J. BUSSINGER, OF PHILADELPHIA, PENNSYLVANIA, ASSIGNOR TO NATIONAL SPECIALTY MANUFACTURING COMPANY, OF PHILADELPHIA, PENNSYLVANIA, A FIRM.

COFFEE-MILL.

No. 855,228.  Specification of Letters Patent.  Patented May 28, 1907.

Application filed October 21, 1905. Serial No. 283,770.

*To all whom it may concern:*

Be it known that I, WILLIAM J. BUSSINGER, a citizen of the United States, residing in the city and county of Philadelphia, State of Pennsylvania, have invented a new and useful Coffee-Mill, of which the following is a specification.

My invention consists of a new and useful support for the grinders of coffee mills whereby the adjusted position of the grinders is positively maintained.

It further consists in providing means whereby the adjustment may be accomplished during the operation of the machine.

It further consists of novel features of construction, all as will be hereinafter fully set forth.

Figure 1:
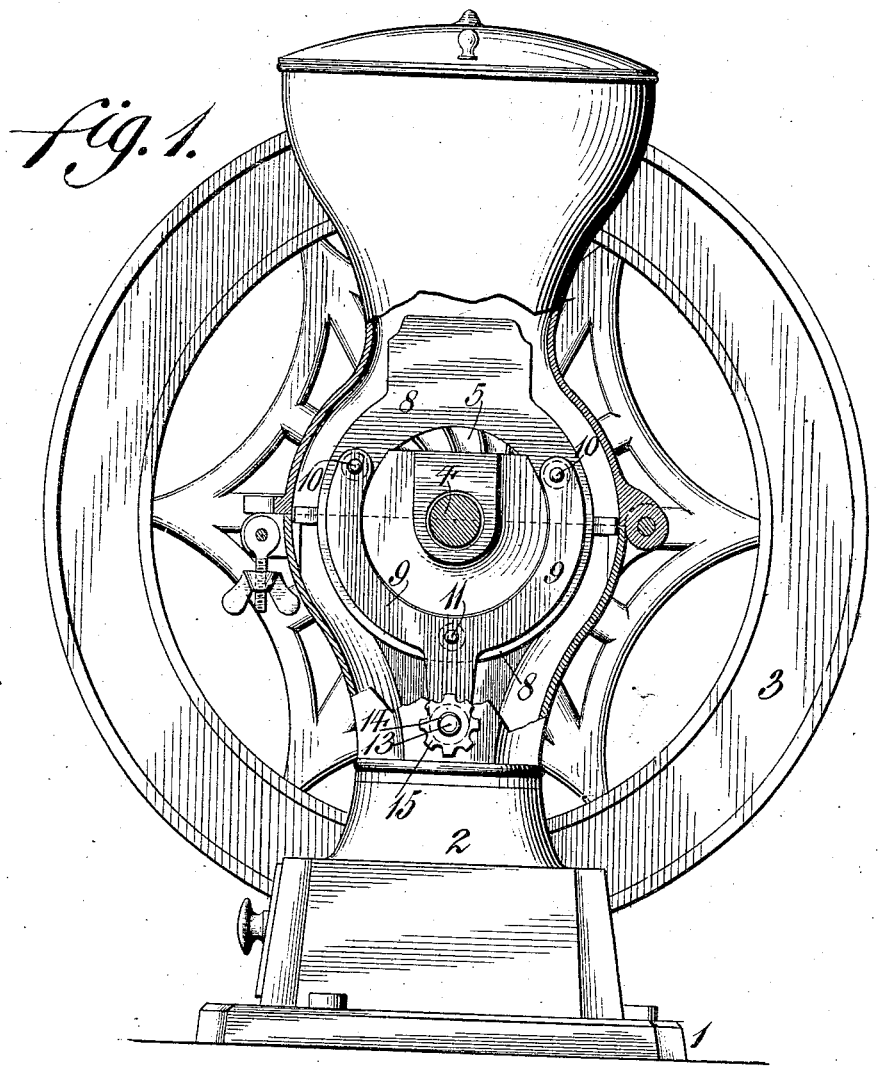
Figure 2:
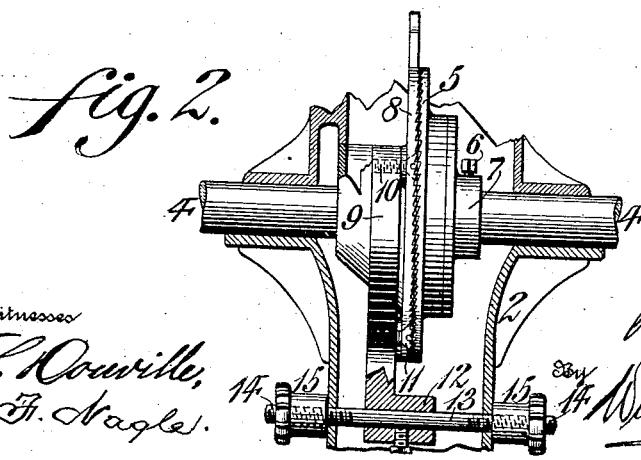

Figure 1 represents a partial side elevation and partial sectional view of the coffee mill showing the support in position. Fig. 2 represents a sectional view of a portion of the device the view being taken at a right angle to that shown in Fig. 1.

Similar numerals of reference indicate corresponding parts in the figures.

Referring to the drawings, 1 designates the base of a coffee mill having a frame 2 suitably connected therewith.

3 designates a wheel mounted upon a shaft 4 which is rotated by the operation of the said wheel. Fixed to said shaft 4 is a revoluble grinder 5 in the present instance being shown as secured thereto by means of set screws 6 passing through the collar 7.

8 designates a stationary grinder which may be laterally adjusted and which is supported by a yoke 9, said yoke having its ends secured as at 10 by screws or otherwise to the said grinder, it being noted that these ends are above the center of the grinder and that the yoke is mounted to correspond to the shape of the said grinder at the portion thereof with which it contacts, said yoke being also secured as at 11 to the said grinder adjacent its lower portion, it being noticed that the yoke contacts with the rear surface of the movable grinder around the major portion of its rim, whereby the surface of the movable grinder will always be held in proper position with respect to the revoluble grinder thus insuring an equal grinding when the parts are secured in the desired position. The yoke 9 is mounted upon the shaft or bar 13, the latter being suitably carried in openings provided in the frame 2 of the mill, in the present instance the yoke is provided with a sleeve 12 through which the rod passes, it being of course understood that the grinder 8 is movably mounted on the shaft 4. The ends of the bar or rod 13 are threaded as at 14 and with it the thumb nuts 15 are adapted to engage on each side of the frame and exteriorly thereto.

The operation of the device will be readily seen. Motion being imparted to the wheel 3 the shaft 4 is rotated and with it the revoluble grinder 5 and the material to be ground is directed between the grinder in order that the effect of the same be received. To increase or diminish the space between the grinders to provide for fine or coarse grinding one of the nuts 15 is loosened and the other is tightened whereby the rod is moved in its bearings and with it the yoke 9 backwardly and forwardly carrying with it the movable grinder 8, which is thus brought nearer or farther away from the revoluble grinder, it being seen that this operation can be accomplished while the machine is running, the saving of time by this and the advantages of which will be evident. In addition, the grinders will be positively held in proper relation to each other by reason of the support of the yoke which forms a firm bearing surface for the movable grinder and prevents displacement of the same.

It will be evident that various changes may be made by those skilled in the art, which may come within the scope of my invention and I do not therefore desire to be limited in every instance to the exact construction herein shown and described.

Having thus described my invention, what I claim as new and desire to secure by Letters Patent is:—

1. In a device of the character described, a shaft, a revoluble grinder connected therewith, an adjustable grinder having an opening through which the shaft passes, means independent of the shaft secured to said adjustable grinder on opposite sides of the axial line thereof, and adjustable means supporting said first mentioned means, whereby the adjustable grinder is held in its adjusted positions.

2. In a device of the character described, a shaft, a revoluble grinder connected therewith, an adjustable grinder and a yoke adjustably supported independent of the shaft and rigidly secured to said adjustable grinder and reinforcing that portion thereof which is subjected to the greatest strain.

3. In a device of the character described, a shaft, a revoluble grinder connected therewith, an adjustable grinder, means rigidly secured to the major portion of said adjustable grinder, a rod or bar upon which said means is mounted, means for adjusting said bar, and means for holding said bar in its adjusted position.

WILLIAM J. BUSSINGER.

Witnesses:
WM. O. THOMPSON,
HENRY O. EVANS.